US006446054B1

(12) United States Patent
Mayorga Lopez (10) Patent No.: US 6,446,054 B1
(45) Date of Patent: Sep. 3, 2002

(54) FUZZY INFERENCE SYSTEM OR ADAPTIVE NEURO-FUZZY INFERENCE SYSTEM, AND INTELLIGENT AGENT FOR THE DYNAMIC GENERATION AND RETRIEVAL OF USER INTERFACE SOFTWARE MODULES

(76) Inventor: Rene V. Mayorga Lopez, University of Regina, Faculty of Engineering, Regina, Saskatchewan (CA), S4S 0A2

( * ) Notice: Subject to any disclaimer, the term of this patent is extended or adjusted under 35 U.S.C. 154(b) by 0 days.

(21) Appl. No.: 09/446,823

(22) PCT Filed: Jun. 30, 1998

(86) PCT No.: PCT/CA98/00612

§ 371 (c)(1),
(2), (4) Date: Dec. 27, 1999

(87) PCT Pub. No.: WO99/01262

PCT Pub. Date: Jan. 14, 1999

(30) Foreign Application Priority Data

Jun. 30, 1997 (CA) ............................................. 2209263

(51) Int. Cl.[7] ............................ G06F 15/18; G06F 9/44
(52) U.S. Cl. ................................. 706/2; 706/6; 706/52
(58) Field of Search ................................... 706/2, 6, 52

(56) References Cited

U.S. PATENT DOCUMENTS 5,572,629 A * 11/1996 Choi ........................... 706/52

OTHER PUBLICATIONS

Fuzzy Rule–Based Approach for Robot Motion Control in the Presence of Obstacles, Jon Zhou and G.V.S. Raju, Division of Engineering, The University of Texas at San Antonio, San Antonio, TX 78249, pp. 662–667, published Oct. 17, 1993.

Fuzzy Inverse Kinematic Mapping: Rule Generation, Efficiency, and Implementation, Yangsheng Xu and Michael C. Nechyba, The Robotics Institute, Carnegie Mellon University, Pittsburgh, PA 15213, USA, pp. 911–198, published Jul. 26, 1993.

A Fuzzy Learning Algorithm for Kinematic Control of a Robotic System, Randy A. Graca and You–Liang Gu, Dept. of Electrical and Systems Engineering Oakland University, Rochester, Michigan 48309–4401, pp. 1274–1279, published Dec. 15, 1993.

Combination of Fuzzy Logic and Neural Networks for the Intelligent Control of Micro Robotic Systems, G. Wohlke and S. Fatikow, Institute for Real–Time Computer Systems and Robotics, Faculty for Informatics, University of Karlsruhe, P.O. Box 69 80, W–7500 Karlsruhe 1, Federal Republic of Germany, pp. 691–696, published Jul. 26, 1993.

Obstacle Accommodation Motion Planning, Yansong Shan and Yoram Koren, Senior Member, IEEE, 8259 IEEE Transactions on Robotics and Automation, New York, YY, pp. 36–49, published Feb. 11, 1995.

* cited by examiner

Primary Examiner—George B. Davis
(74) Attorney, Agent, or Firm—McDonnell Boehnen Hulbert & Berghoff (57) ABSTRACT

A method of operating a target system wherein small changes in input variables produce small changes in output variables in a manner permits system learning on a time dependent basis. The rate of change of the system output is directly dependent upon the product of the rate of change of the system input and a matrix consisting of input variables and antecedent and consequent parameters. A preferred performance criterion is obtained through the approximation of the said matrix to a weighted-augmented pseudo-inverse Jacobian. Off-line, the system undergoes a series of iterations using a wide range of input variables wherein the actual outputs are compared to the desired outputs and optimized values for the antecedent and consequent parameters are obtained and passed back to the said matrix for use in the subsequent iteration.

20 Claims, 8 Drawing Sheets

FUZZY INFERENCE SYSTEM OR ADAPTIVE NEURO-FUZZY INFERENCE SYSTEM, AND INTELLIGENT AGENT FOR THE DYNAMIC GENERATION AND RETRIEVAL OF USER INTERFACE SOFTWARE MODULES

BACKGROUND OF THE INVENTION

Fuzzy Inference Systems (FIS) and Adaptive NeuroFuzzy Inference Systems (ANFIS) exist for use in the operation of a target system. FISs and ANFISS are used in control problems and decision making problems. With control problems, the FIS or ANFIS act as a feedback control for the target system so that the inputs to the target system are properly changed based on actual system outputs. With decision making problems, the decision making rules of the target system may be "fuzzified" to provide for better decision making.

While FISs and ANFISs have been applied to many target applications, it has not been contemplated to apply an FIS or an ANFIS to the control of a user interface such as a screen display.

Over the past decade, many software programs have been developed for the display of descriptive information such as: multi-media units, web pages, graphic user interfaces (GUIs), cd-rom information, graphics, diagrams, etc. Most of these software programs are conceived to generate and display the information in a static fashion. That is, once an output is generated, the user (although he/she can manipulate the displayed information in a given framework) does not have a priori the means to change the structure and preferred way to display the available information. Consequently, and this is more true for multi-media and web-pages modules, the retrieved module may contain unnecessary (from a particular user point of view) information that makes its display cumbersome and/or lengthly and, consequently, time consuming.

Recently some commercial packages are starting to appear that provide a particular user some a priori options to display (web-pages, multi-media units) in an active/dynamic fashion the available information. However, the a priori options are few and rather limited. That is, once an option is selected the display module is generated according to some simple rules. These rules do not take into consideration a wide range of experts knowledge, nor do they display the information on the principle that for some small changes in the input, there should be some small changes in the output. Furthermore, it is very important to notice that the options to the user are currently of a crisp nature.

SUMMARY OF THE INVENTION

This invention seeks to develop an advanced FIS or ANFIS as an Intelligent Inference System which is useful for a wide variety of applications including the control of a screen display.

According to the present invention, there is provided

The development and application of an Intelligent Agent for the dynamic generation/retrieval and operation of descriptive/display software modules.

The development and application of an Intelligent Inference System for decision making/resolution cases: in particular for the design of descriptive/display software modules.

The development and implementation of an Adaptive Neuro-Fuzzy Inference System as an Intelligent Inference System.

The development and implementation of an Adaptive Fuzzy Inference System as an Intelligent Inference System.

The development and implementation of a Fuzzy Inference System as an Intelligent Inference System.

The development and implementation of a Performance Criterion for the Intelligent Inference System.

An active and dynamic input interface that allows crisp and fuzzy inputs.

A crisp and fuzzy (input) icon.

BRIEF DESCRIPTION OF THE DRAWINGS

In the drawings which describe example embodiments of the invention.

DETAILED DESCRIPTION OF THE PREFERRED EMBODIMENTS

The screen display control system developed here is envisioned as an intelligent, generic, interactive, user friendly unit, and computer platform independent: with the purpose of properly generating and displaying a module in a way preferred/selected a priori by the user.

Here, "intelligent" has the connotation of incorporating a wide range of Experts knowledge in the design rules: and then modifying/optimizing it (based on a novel Performance Criterion) according to the principle that for small changes in inputs it should correspond a small change in the outputs.

Furthermore, it is also important to mention that the Intelligent Agent is devised to deal with user options of a crisp and fuzzy nature.

Two types of users are foreseen:

Type I. Active procreators, "authors".

Type II. Active recipients, "readers".

Here "active" has the connotation of dynamically interactive and contrary to a possible passive static fashion as previously mentioned. On the other hand, procreator has the implication of being the original module creator.

The Intelligent Agent is devised such that a human being (Type I) can easily interact with a user friendly active interface by answering questions (of a crisp and/or fuzzy nature), and/or selecting options via a crisp/fuzzy icon. The software system will then instantaneously generate a dynamic descriptive module. This module can be instantaneously accessed by the Type I user and be retrieved to be displayed as preferred at any time: and/or also be instantaneously retrieved and displayed as preferred by Type II users in other (which can be distant) server sites at any time.

Figure 1:
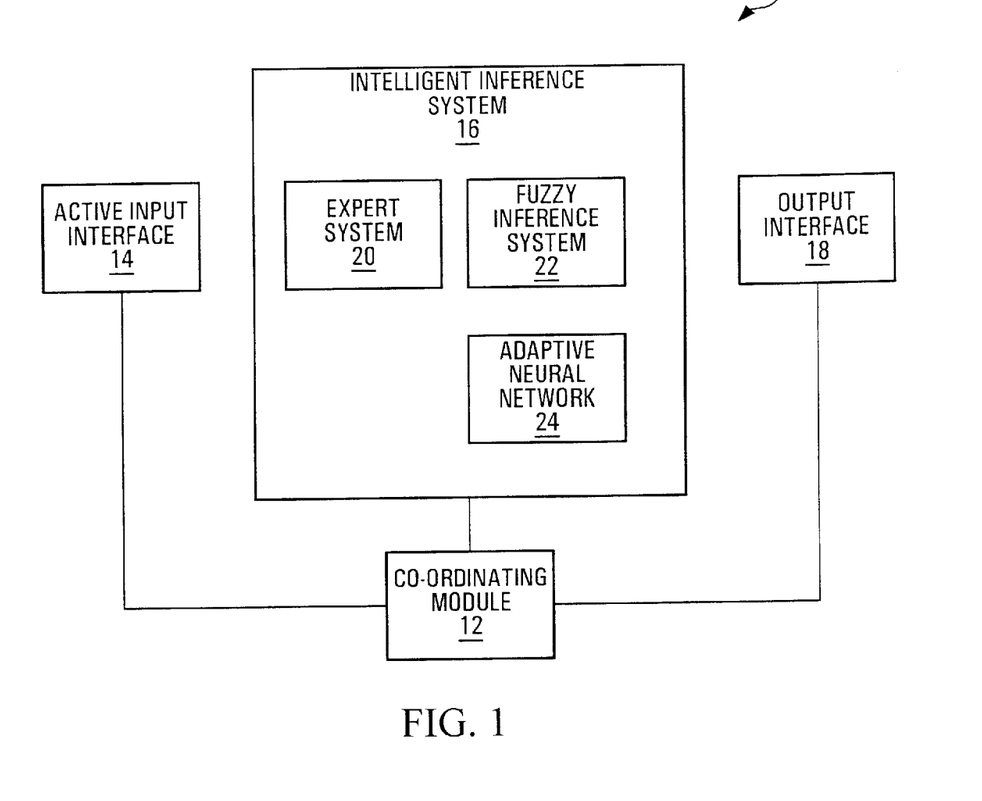
FIG. 1 is a software block diagram of an intelligent agent made in accordance with this invention.

The Intelligent Agent (10) with reference to FIG. 1, is an integrated software system consisting of a Coordinating Module (12) which properly coordinates and manipulates inputs/output of an Active Input Interface (14), an Intelligent Inference System (16), and an Output Interface (18). The Intelligent Inference System is the core of the Intelligent Agent. It consists of an Expert System (20), a Fuzzy Logic Inference System (22), and an Adaptive Neural Network (24). Here, some Schemes for proper parameter scaling, tuning/updating, and learning are provided, such that the Intelligent Inference System can be constructed and operated as: a Fuzzy Inference System, or as an Adaptive Fuzzy Inference System, or as an Adaptive Neuro-Fuzzy Inference System.

Unlike other current intelligent inference systems, here the devised system is conceptually considered, in a novel fashion, at the rate of change level. Under this proposed framework a novel criterion (i.e. measure) of system performance is derived. This criterion facilitates the implementation of a type of control system to the decision analysis/resolution for the module design. Furthermore, this criterion also permits the proper tuning and updating of the antecedent/premise, scaling, and consequent parameters in the Fuzzy Logic Inference System. As a result the devised Intelligent Inference System exhibits some desirables features and properties (such as efficiency, reduced subjectivity, stability with respect to small changes in the system inputs) missing in other current intelligent inference systems.

The gathered information via the Active Input Interface is passed to the Coordinating Module. Then, it is properly transferred to the Intelligent Inference System which in turn generates a decision resolution (diagnostic) for the proper design of the descriptive module. This decision resolution has taken into account user options and the experts knowledge: it can be considered as an intelligent compromise. The result of the decision resolution is finally feed into tie Output Interface for the actual generation and display.

The Coordinating Module of tie Intelligent Agent is a software program with the purpose of manipulating and coordinating the inputs and outputs of the Active Interface, the Intelligent Inference System, and the Output Interface.

Since the Intelligent Agent system is envisioned as an intelligent, generic, interactive, user friendly unit, and computer platform independent: it is assumed here that the system installation aspects and initialization protocol are easily accomplished. It is also assumed that the Type I user for the generation mode has prepared and installed or assembled some descriptive sub-units (such as text, audio, film, video, graphics, diagrams, link files, etc.) in a specified yet general (presumably, but not necessarily, hierarchical, prioritized order) format. It is also assumed that the Type II user has installed the same Intelligent Agent system.

In the generation mode, the preferred options are requested via the Active Input Interface, and then from the selected ones the proper information inputs are feed into the Intelligent Inference System. The output is then used to properly set the command tags/labels (values) in a generated (advanced Hypertext Language type such as, but not necessarily, the HTML: or the Extensible Markup Language XML) descriptive module for screen display. In the retrieval mode, similar steps are taken. However, in this case there is no actual module generation: rather, the target module is the retrieved descriptive module for screen display to which the updated tags/labels (values) are just passed.

The tags are generally filename extensions. By setting the values of these tags, selected files (module sub-units) can be activated or ignored. In this way, text in a file, images/pictures, static/dynamic graphics, figures, frames, icons, etc, would be properly placed or would not be displayed: or an audio or video file (module sub-units) would be played in a proper order, or would not be played.

The Active Input Interface is an input interface which consists of a software program that generates (of a crisp and fuzzy nature) questions and/or display possible options, via a crisp/fuzzy icon, for Type I or Type II users: and then accepts the answers and/or preferred options.

For the generation mode the posed options (questions) to select can be related, amongst others, to the following subjects:

Nature of module
 The content of the module;
 The purpose of module.
Display Information attributes:
 Spatial organization (placing of text, graphics, etc.);
 Structural hierarchy (division of chapters, sections)
 Levels
Design Features
 The preferred generation/retrieval format (frames, multiple layers, etc.)
 Decorative features (icons, marks signs, etc.)
 Special features (such as links to other sites, link maps, etc.)

For the retrieval mode, one could additionally or instead select some desired features related to:

Retrieval priorities;
Contents percentage:
Module Length:
Browse features.

Although the user should have as many options as possible, the available options should be designed to facilitate interaction and comply with a simple and "intelligent" mode of operation as much as possible.

Figure 5A:
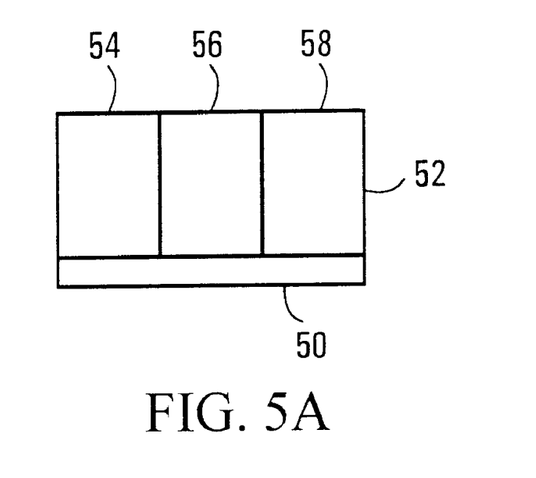
FIGS. 5a, 5b, 5c and 5d are schematic variants of icons which may be used with this invention.
Figure 5B:
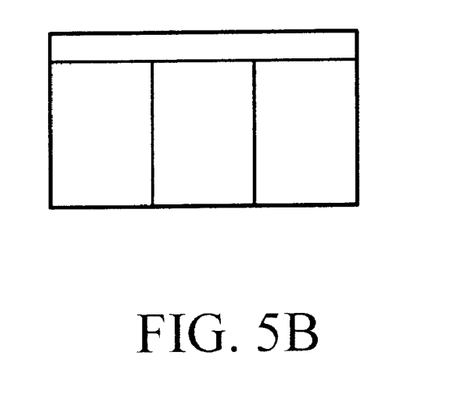

The collected information then is passed to the Coordination Software module which manipulates it to properly feed it to the Intelligent Inference System, and to the Output Interface. There are several ways to conceive a crisp/fuzzy icon. One that permits easy interaction and does not require much familiarization is the following. The icon of FIG. 5a is displayed, as current conventional ones, at the click of a crisp button. But each layer of displayed option is designed such that each of its slots is divided in two horizontal parts. The lower (or conversely, in FIG. 5b, the top) part 50 is a fraction of the size (i.e. 0.2) of the upper (or bottom) one 52. The upper (or conversely, the bottom) one is further divided vertically in several parts 54, 56, 58: each corresponding to a range of the fuzzy attribute of the selected option. The lower (or conversely, in FIG. 5b, the top) part 50 in the other hand is just a crawl bar that depending on where is clicked, it transmits a corresponding attribute value. In this manner the user has the option to transmit preset ranges of values of fuzzy attributes: or a specified value for a fuzzy attribute. In the case of a crisp option, the corresponding slot is just a conventional one.

Figure 5C:
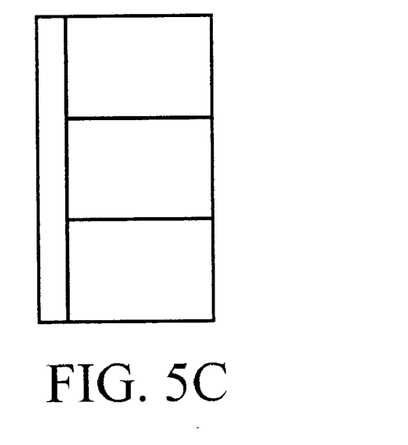
Figure 5D:
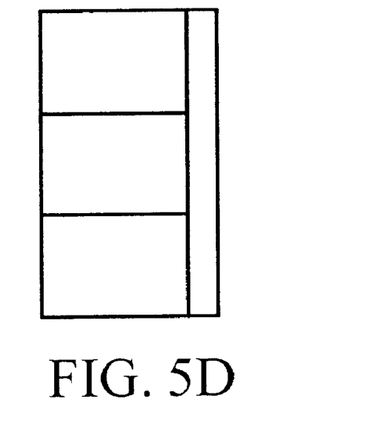

A variant to this model, seen in FIG. 5c, consists on dividing the displayed option in two vertical parts. The left (or conversely, in FIG. 5d, the right) part is a fraction of the size of the right (or left) one. The right (or conversely the left) is further divided horizontally in several parts: each corresponding to a range of the fuzzy attribute of the selected option. The left (or conversely, in FIG. 5d, the right) is just a crawl bar that depending on where is clicked, it transmits a corresponding attribute value.

First, it should be mentioned that there are many ways to design, built, and implement intelligent inference systems. Also, there are many technical issues and aspects that can influence/affect their efficiency. Usually, intelligent inference systems are developed for the intelligent control of systems. Furthermore, they are usually formulated at the functional level.

Here, a proper framework to develop intelligent inference systems is considered. That is, here the developed intelligent system is geared towards intelligent decision analysis and resolution, and applied to the design of descriptive/display modules. Unlike current intelligent inference systems, here the devised system is conceptually considered, in a novel manner, at the rate of change level.

Under the proposed framework a relationship between the rate of change of the outputs with respect to the rate of change of the inputs is established. From this relationship it is quite straight forward to identify a characteristic matrix, from which a novel criterion of system performance can be derived.

The presented framework has been devised to address and deal effectively with the following issues. In most decision making and resolution problems it is difficult to identify a priori a reference, to justify or define a proper target error. Therefore, for this kind of problem it is difficult to implement intelligent inference systems which were originally conceived for systems control. Also, it is difficult to conceptually ensure that open-loop intelligent control systems will yield small outputs for relatively small inputs, if applied to decision analysis problems of a highly non-linear nature. The devised formulation presents the following desirable characteristics:

Reduce any possible subjectivity introduced in the Expert system:

Establishes a proper criterion to deal effectively with the inherent decision analysis and resolution prproblem for the module design.

Facilitates dealing with decision analysis and resolutions issues:

Ensures that for small changes in the input, small changes in the output result;

Permits a fine tuning and updating of the membership functions in the Fuzzy Inference System.

The devised Intelligent Inference System is envisioned to include an Expert System, a Fuzzy Inference System. and an Adaptive Neural Network. Once the parameters of the Fuzzy Inference System (FIS) are properly tuned according to the Schemes presented here, it becomes an Adaptive Fuzzy Inference System (AFIS). Alternatively, the Adaptive Neural Network posses an architecture to represent this FIS. In fact, this system constitutes a Coactive Adaptive Neuro-Fuzzy Inference System (Jang J.-S., R., Sun C.-T., Mizutani. Neuro-Fuzzy and Soft Computing, Prentice Hall Inc., Upper Saddle River, N.J. 1997). This system can also be properly trained off-line over a wide range of inputs according to the Schemes provided here. This training process allows it to deal with a variety and diversity of inputs in real situations. Once the system is properly tuned, then is ready to be used on-line at any time. Therefore, the Intelligence Inference System can be constructed and operated based on: the Fuzzy Inference System, or as an Adaptive Fuzzy Inference System, or as an Adaptive Neuro-Fuzzy Inference System. The selection of the construction and operation mode will depend on the intended application and some implementations issues.

The function of the Expert System is to set properly the inference rules and membership functions that are to be used by the Fuzzy Inference System. The inference rules are determined by gathering Experts knowledge available in the literature and modifying these rules according to the system needs.

The following (reported) module design issues such as:
Module Structure:
Module Content:
Module Functionality:
Software System Development:
System Performance:
from some Experts can be considered to establish the inference rules.

From the collected data also the membership functions are constructed. However, they serve only as the initial set to be considered by the parameter tuning/updating process. For the adaptive neural network, they can be considered as an initial set in the initial forward pass. Afterwards, they can be modified by subsequent backward passes required in the training/learning of the adaptive neural network.

The Fuzzy Logic Inference System is a Sugeno Type (several types could be considered, but at least a first order is necessary) with proper T-norms and T-conorms (Jang J.-S. R., 1989). The considered membership functions contain antecedent/premise, scaling, and consequent parameters that can be properly tuned/updated according some appropriate Schemes provided here. For the equivalent adaptive neural network these Schemes can be implemented such that the antecedent/premise and scaling parameters are regularly tunned by the backward pass. On the other hand, the output functions contain consequent parameters that can be updated at the end of the forward pass. Also, here the option to incorporate weight/measures of importance for (membership functions scaling) rule discrimination and input selection is considered.

The selection of a Sugeno Type of Fuzzy Inference System is the result of the following fact. This type yields output functions explicitly depending on the inputs. This feature is quite relevant under the considered framework. That is, this type facilitates here the identification of a relationship between the rate of change of the outputs with respect to the rate of change of the inputs, which is governed by a characteristic matrix here denoted as M.

Since the characteristic matrix M governs the system behaviour, it serves to define a novel Performance Criterion (i.e performance measure). Furthermore, the optimization of this criterion should ensure that small output changes will be obtained for small input changes into the system.

Depending on the intended application of the Intelligent Agent, the relationship between the output and the input can be considered an approximation to an inverse function or a direct function relationship. For either case, it is easy to obtain an inverse approximation or direct relationship for the rate of change of the outputs with respect to the inputs.

If an approximation to an inverse function is considered, it is easy to show that the characteristic matrix M is an approximation to a Pseudoinverse matrix (Golub G. H., Van Loan C. F., Matrix Computations. 2nd Ed. The Johns Hopkins University Press 1989). On the other hand, if a direct relationship is considered then the characteristic matrix M is a Jacobian matrix (Golub G. H., 1989). Therefore.,the characteristic matrix M can be considered either as a pseudoinverse, or as a Jacobian matrix.

Moreover, if conceptually an approximation to an inverse function is considered, the norm of the characteristic matrix M can be selected as a Performance Criterion. At the theoretical level this norm should satisfy a consistency condition (Stewart G. W., Introduction to Matrix Computations. Academic Press. Inc., 1973), also called submultiplicative property (Golub G. H. 1989). However, for practical purposes it is convenient to consider the so-called p-norms (in particular for p=1, 2, and ∞). and the Frobenius norm (Golub G. H. 1989). The selection of this Performance Criterion is due to the following facts. First, notice that in a neighborhood of the set of rank deficient matrices, for small changes in the input, large changes can be induced in the output. Also notice that the 2-norm of the pseudoinverse matrix is precisely equal to the inverse of the smallest singular value (from the Singular Value Decomposition (SVD) of the Jacobian). Now, since the smallest singular value is a measure of the distance to the set of rank deficient matrices: the conceptual minimization of the inverse of the singular value will ensure a large distance to this set. Consequently, ensuring that for small changes in the input, small changes are induced in the output. Notice that the 2-norm can be difficult to express explicitly. However, the Frobenius norm is a tight bound for the 2-norm, and it can be easily expressed explicitly. Moreover, it is continuously differentiable on a large domain. Therefore, it is preferable to use the Frobenius norm of the characteristic matrix M as a Performance Criterion.

On the other hand, if conceptually a direct function between the output with respect to the input is considered: then the Performance Criterion can be set as the Frobenius norm of the characteristic matrix divided by the sum of the Frobenius norm of the rate of change of the characteristic matrix with respect to each of the parameters. This selection is due to the fact that by setting it in this way, its minimum will imply a neighborhood with a small bound on the condition number of the characteristic matrix M. Since a small condition number also implies a situation far from the set of rank deficient matrices, the Performance Criterion is justified. However, in this case small changes in the output will imply small changes in the input.

In most applications the input space is related to a desired performance, whereas the output space is related to the system structure and elements that deliver that performance. Then, in most cases it is preferably to conceptually consider that the intelligent inference system is approximating an inverse function that relates the output with respect the input. Therefore, the preferred Performance Criterion to use is the one given by the Frobenius norm of the characteristic matrix M.

The entries of the characteristic matrix M are expressed explicitly in terms of the antecedent/premise, scaling, and consequent parameters. Hence, the devised Performance Criterion can be easily expressed explicitly in terms of the antecedent/premise, scaling, and consequent parameters. Therefore an objective function can be easily defined and which is optimized, subject to some constraints, at the end of the forward pass of the adaptive neural network. This optimization process yields the proper updating of the consequent parameters.

In the following development a more detailed description of the developed Fuzzy Inference System and some novel Learning Schemes are presented. First, it necessary to establish a proper formulation for some general systems relationships.

For a general system, at any instant of time, a set of variables in the plant (causal state) operational space establishes a unique set of variables in the task/performance (effect state) space. Formally, consider a system with n plant variables. At any instant of time, denote these variables by $\psi_i = \psi_i(t)$: i=1, 2, ... n. Also, define the task/performance variables describing system tasks by a vector of m variables $y_j = y_j(t)$: j=1,2, ... m. Notice, that for m<n the system is redundant: whereas, for m>n the system is overdetermined.

Also, let $t \in [t_o, t_f]$ where $t_o$ and $t_f$ are the initial and final time of the task interval: and let $\Re^m$ and $\Re^n$ be the m-dimensional and the n-dimensional Euclidean spaces respectively. Assume that $y = y(t) = [y_1, y_2, \ldots, y_m]^T \in \Re^m$ and $\psi = \psi(t) = [\psi_1, \psi_2, \ldots, \psi1_n]^T \in \Re^n$ are related by:

$$y(t) = F(\psi(t)) \qquad (1)$$

In many applications it is desired that the task variables (effect state) follow a reference/specified state transition, and it is required to calculate the corresponding plant variables (causal state). This implies establishing an inverse relationship from Eq.(1). In general, this relation is nonlinear: hence an analytical inverse relationship cannot be easily obtained. Notice that in this case, y(t) acts as an input: whereas $\psi(t)$ can be considered as an output. Under a local approach the problem can be treated at the inverse functional and rate of change level. That is, the problem can be addressed in the following indirect fashion. By differentiating Eq.(1) with respect to time, the next equation is obtained:

$$\dot{y}(t) = J(\psi(t))\dot{\psi}(t) \qquad (2)$$

where $$\dot{y} = \dot{y}(t) = dy(t)/dt, \dot{\psi} = \dot{\psi}(t) = d\psi(t)/dt.$$

and $$J(\psi) \equiv J(\psi(t)) = \frac{\partial}{\partial \psi}\mathcal{F}(\psi(t)). \qquad (3)$$

is the (m×n) Jacobian plant matrix.

From the Eq.(2), it is possible to compute a $\psi(t)$ state transition in terms of a prescribed state transition y(t). Following an analytical procedure to deal with an inverse kinematics problem (Kreutz-Delgado K., Agahi D., "A Recursive Singularity-Robust Jacobian Generalized Inverse. IEEE Trans, on Robotics and Automation. Vol. 11, No.6, December 1995), (Mayorga R. V., et al. "A Fast Approach for Manipulator Inverse Kinematics Evaluation and Singularities Prevention". Journal of Robotics Systems, Vol. 9 (8), February 1993), it can be easily shown that, for m<n a general solution in an inexact context is given by:

$$\dot{\psi} = J_{wz\delta}^+(\psi)\dot{y} + [I - J_{wz\delta}^+(\psi)J(\psi)]v; \qquad (4)$$

where I is the (n×n) identity matrix: v is an arbitrary vector, intended for constraints compliance; and the weighted-augmented pseudoinverse $J_{wz\delta}^+(\psi)$ is given by:

$$J_{wz\delta}^+(\psi) = [J(\psi)^T Z J(\psi) + \delta W]^{-1} J(\psi)^T Z; \qquad (5)$$

which, it can also be expressed as $$J_{wz\delta}^+(\psi) = W^{-1} J(\psi)^T [J(\psi) W^{-1} J(\psi)^T + \delta Z^{-1}]^{-1}; \qquad (6)$$

where, δ>0; and the positive definite symmetric matrices W, Z, act as metrics to allow invariance to frame reference and scaling (homogenize dimensions). Notice that the purpose of the parameter δ is to ensure well-conditioning in Eqs.(5), and (6). Also, notice that for redundant systems m<nj so, it is more convenient to consider the Eq.(6). Alternatively, for nonredundant systems, m≥n. v=0 in Eq.(4); and it is more convenient to consider Eq.(5). Also it is important to observe that Eq.(4) turns out to be the exact solution by setting δ=0 in Eq.(5), or in Eq.(6). In general, δ=0; and it becomes activated (δ≠0) according to a robustness Scheme only in those instances in which the Jacobian matrix become ill-conditioned. Now, in the following developments $\|.\|_s$ represent a standardized norm which can be expressed in terms of a weighted 2-norm. That is, in Task Space $$\|\dot{y}\|_s = (\dot{y}^T Z \dot{y})^{1/2} = \|Z^{1/2}\dot{y}\|_2 = \|\dot{y}_z\|_2; \quad (7)$$

where, $\dot{y}_z = Z^{1/2}\dot{y}$. Whereas, in the Plant Space $$\|\dot{\psi}\|_s = (\dot{\psi}^T W \dot{\psi})^{1/2} = \|W^{1/2}\dot{\psi}\|_2 = \|\dot{\psi}_w\|_2; \quad (8)$$

where, $$\dot{\psi}_w = W^{1/2}\dot{\psi}.$$

Thence, also let $$\|J(\psi)\|_s = \|J_{wz}(\psi)\|_s = \|Z^{1/2}J(\psi)W^{-1/2}\|_2; \quad (9)$$

and $$\|J_{wz\delta}^+(\psi)\|_s = \|W^{1/2}J_{wz\delta}^+(\psi)Z^{-1/2}\|_2 \quad (10)$$

Next observe that from Eq.(4)

$$\dot{\psi} - v = J_{wz\delta}^+(\psi)[\dot{y} - J(\psi)v]. \quad (11)$$

Thence, it is clearly observed that the proposed formulation has lead to the development of an inverse effect-casual time-variant relationship.

Now, notice that for a general class of conventional Fuzzy Inference Systems (FIS), such as the Sugeno Class: the system output $\Omega$ can be explicitly expressed as a function of the antecedent/premise, scaling, and consequent parameters, and also in terms of the input variables. That is, $$\Omega = F_2(\alpha, c, u) \quad (12)$$

where, c are the consequent parameters: $\alpha$ are the antecedent/premise and scaling parameters: and u are the system inputs. Notice that here $\alpha$ includes scaling parameters, which are usually utilized to scale the membership functions according to simple relations. These parameters can be considered as the "importance measures" to scale the membership functions using the simple relations provided in (Jang J.-S., 1997). Notice that this expression can also be expressed as:

$$\Omega = M_o(\alpha, c, u)u: \quad (13)$$

where, $M_o$ is an (n×m) matrix. This class uses Eq.(12) with fixed parameters and has been successful for some Control Problems (Jang J.-S., 1997). However, the Adaptive Fuzzy Inference Systems (AFIS) and Co-Active Neuro-Fuzzy Inference Systems (CANFIS), that include Schemes for tuning/updating the parameters, have demonstrated a superior/better performance (Jang J.-S., 1997).

In fact, one of the most important and distinguishing characteristics of AFIS and CANFIS, is the ability to tune/update the parameters for Learning purposes. Usually, the construction of conventional AFIS and CANFIS is based on approaches that establish some standard error measures from which some proper tuning/updating Schemes are developed. Moreover, these procedures have been conceptually devised for modelling or approximating direct functions. Unlike these conventional approaches, here a novel Performance Criterion is presented and utilized to develop novel Schemes for parameter tuning/updating. Furthermore, the approach considered here has been conceptually devised to approximate inverse functions.

Now, observe that from Eq.(12), it follows that $$\dot{\Omega} = J_2(\alpha, c, u)\dot{u}; \quad (14)$$

where, $J_2 = \partial F_2/\partial u$. For notation purposes let the (n×m) matrix $M(\alpha, c, u) \equiv J_2(\alpha, c, u)$: thence, $$\dot{\Omega} = M(\alpha, c, u)\dot{u}. \quad (15)$$

As will be appreciated by those skilled in the art, the matrix $M(\alpha, c, u)$ contains one or more elements of $\alpha$, c, u. Now, let the output of the inference system be related to the plant variables as follows:

$$\dot{\Omega} = \dot{\psi} v; \quad (16)$$

whereas, the input of the inference system be related to the task variables:

$$\dot{u} = \dot{y} - J(\psi)v: \quad (17)$$

thence, by Eq.(15) it follows that $$\dot{\psi} - v = M = M(\alpha, c, u)[\dot{y} - J(\psi)v]. \quad (18)$$

Then, clearly from Eqs.(11) and (18) it can be easily observed that $$M(\alpha, c, u) \Leftrightarrow J_{wz\delta}^+(\psi): \quad (19)$$

that is, the matrices $M(\alpha, c, u)$ and $J_{wz\delta}^+(\psi)$ are directly related. Then, in practice for the considered FIS class, the matrix $M(\alpha, c, u)$ should be constructed in some way such that $$M(\alpha, c, u) \rightarrow J_{wz\delta}^+(\psi). \quad (20)$$

In general, for Control problems there is available a desired or reference (optimal) solution, and an error measure is usually defined in terms of the difference between the desired or reference output and the actual system output. This error measure is normally used by AFIS and CANFIS for Learning purposes by properly optimizing the error measure according to some parameter tuning/updating Schemes (resulting in an appropriate shifting and shaping of the membership functions).

However, the application of FIS for Decision Making or Decision Resolution problems is not as simple. This is due to the fact that it is not easy to justify a priori a desired nor optimal output vector. At most the output may incorporate some experts knowledge. Then, since it is difficult to justify a priori a desired or optimal output vector, it is also difficult to establish a priori an error measure to devise schemes for proper parameter tuning/updating. Therefore, the construction and application of AFIS or CANFIS for Decision Making or Decision Resolution problems becomes more complicated, mainly due to the additional difficulty in establishing an error measure.

For the general class of FIS considered here, a possible way to deal with the difficulty is to establish as a target for optimization a Performance Criterion, rather than an error measure. Here, Eq.(19) precisely serves this purpose and leads to the development of the proposed approach. First, all important property of $J_{wz\delta}^+(\psi)$ is exploited. It is well known in the literature that the norm (as considered here) of this matrix determines the system behaviour. From Eq.(11) it easily follows that:

$$\|\dot{\psi} - v\| \leq \|J_{wz\delta}^+(\psi)\| \; \|\dot{y} - J(\psi)v\|. \quad (21)$$

That is, the smaller the value that $\|J_{wz\delta}{}^+(\psi)\|$ takes, the smaller is the upper bound of the norm of the output $\dot\psi - v$ it. Therefore, in view of the Eq.(19), the norm of the matrix M constitutes a meaningful Preformance Criterion.

Thence, here two main issues are considered:

the Optimization of the Performance Criterion: that is, the Minimization of the norm of M: and to ensure that $M \to J_{wz\delta}{}^+$, by establishing a proper constraint for the Optimization process.

In order to develop a proper strategy for parameter tuning updating it is necessary to consider the following development. For simplicity purposes, let's drop the subindex s from $\|.\|$, in the subsequent expressions.

Figure 3:
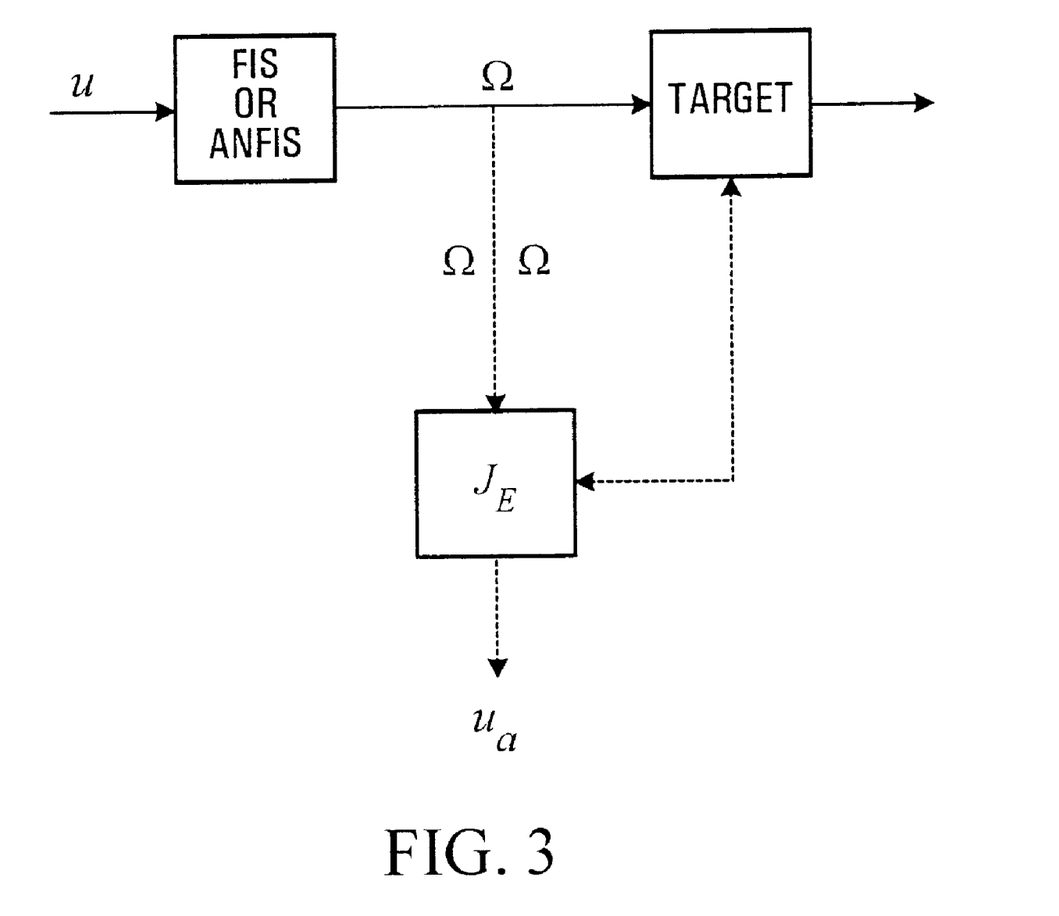
FIG. 3 is a block diagram illustrating an FIS or ANFIS made in accordance with this invention together with a target system.
Figure 4A:
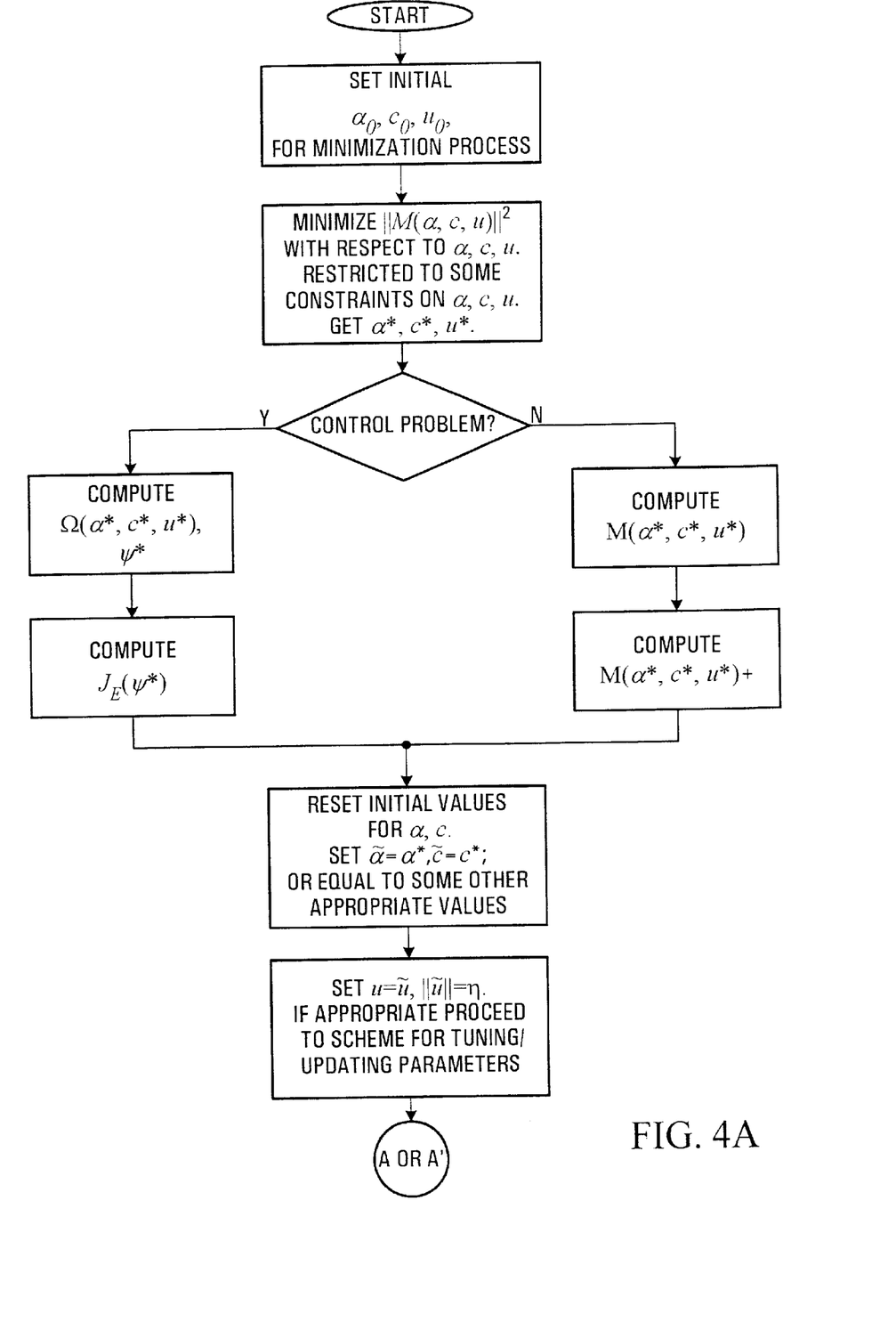
FIGS. 4a, 4b, 4c, 4d and 4e comprise a flow diagram for software control for,use in developing an FIS or ANFIS made in accordance with this invention.
Figure 4B:
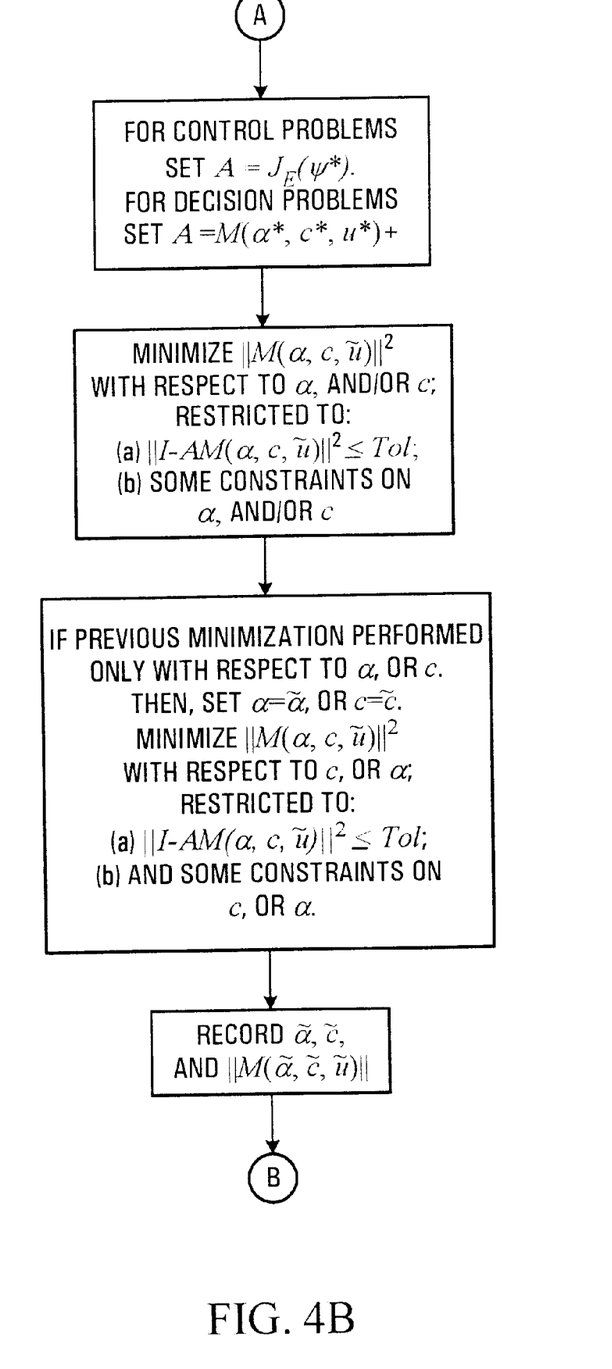
Figure 4C:
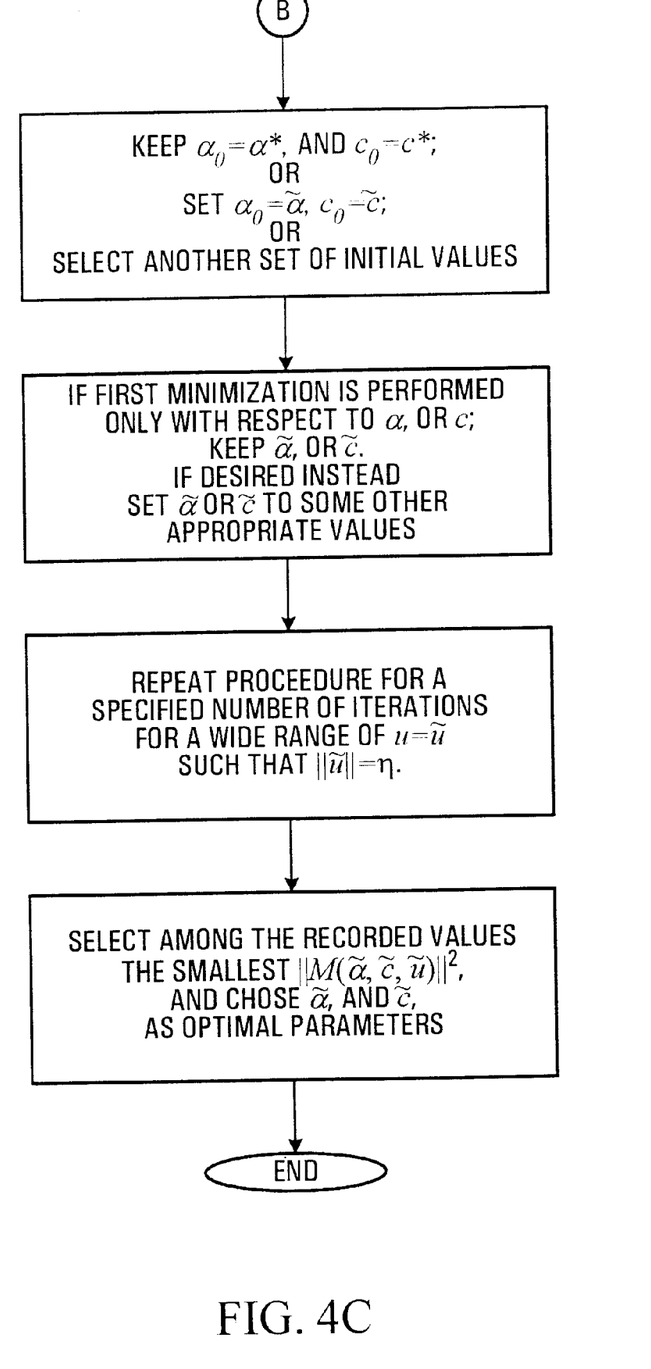
Figure 4D:
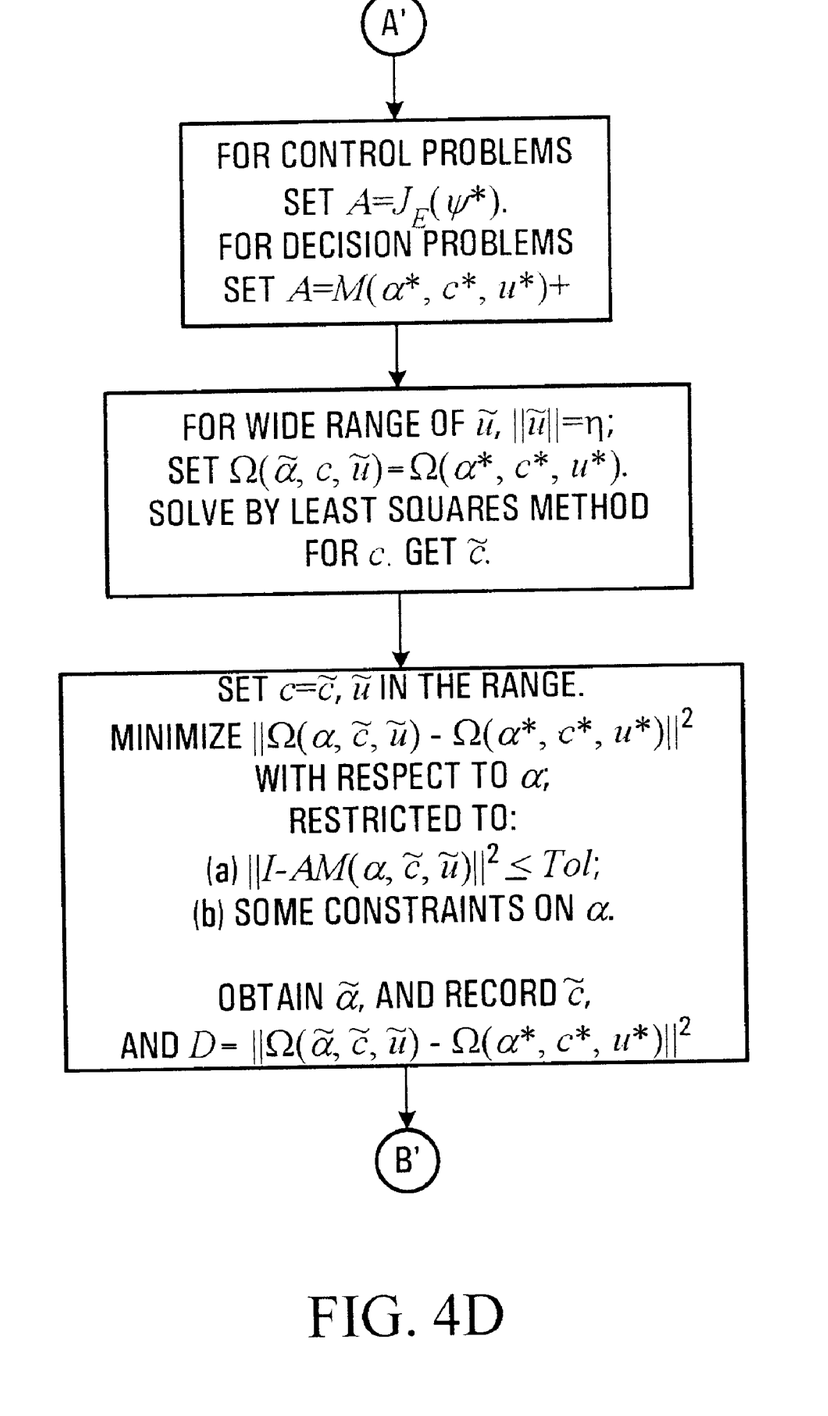
Figure 4E:
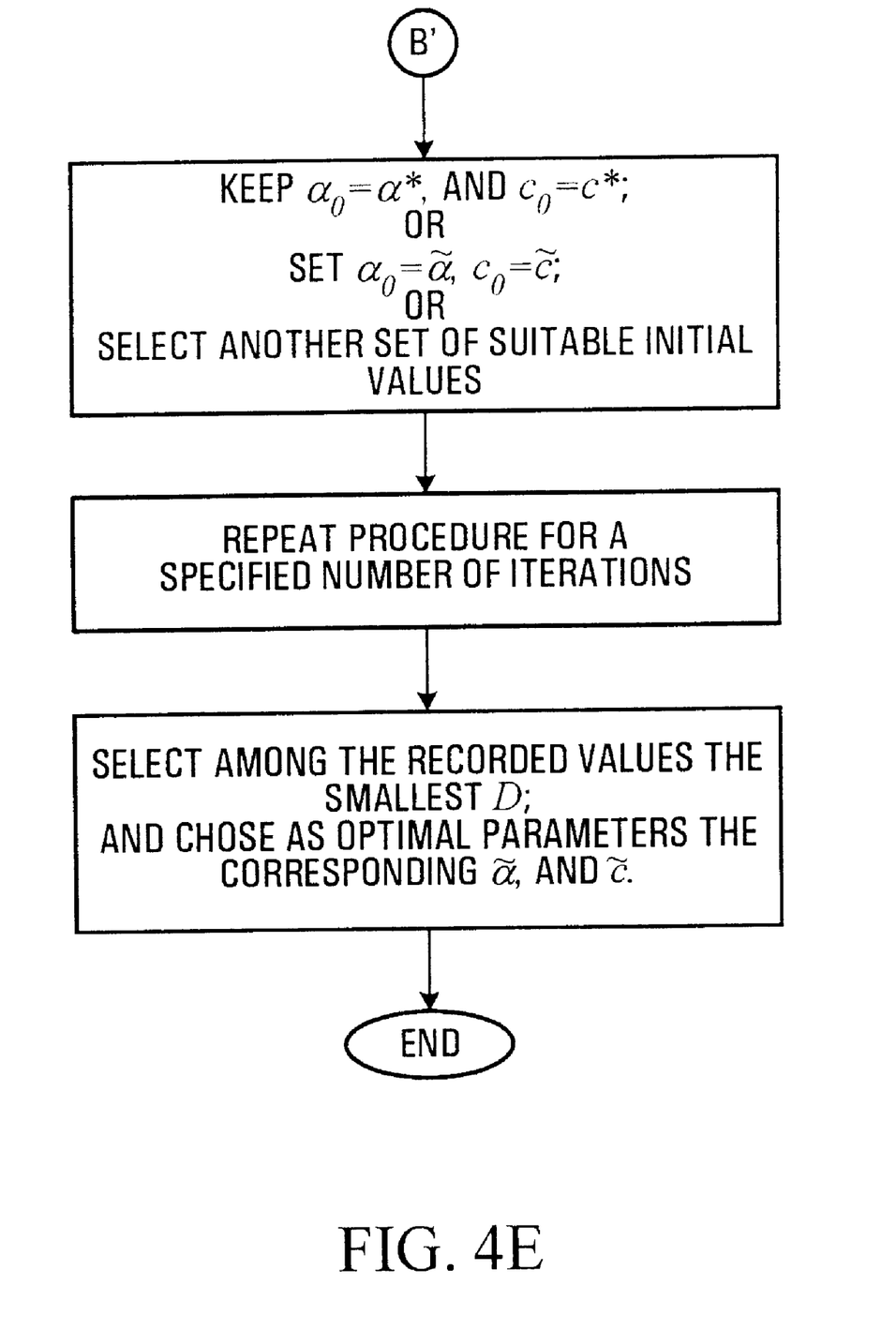

First, let's define (refer to FIG. 3) the actual task transition corresponding to the output $\dot\Omega$ as:

$$\dot u_\alpha = J_E \dot\Omega; \qquad (22)$$

where $J_E$ is an approximation to the Jacobian matrix J. Thence, by Eq.(15)

$$\dot u_\alpha = J_E M(\alpha, c, u) \dot u. \qquad (23)$$

Then, the difference between it desired or specified task transition, and the actual one obtained from the output of the inference system is given by $$\dot u - \dot u_\alpha = \dot u - J_E M(\alpha \cdot c \cdot u)\dot u \qquad (24)$$

$$= [I - J_E M(\alpha \cdot c \cdot u)]\dot u. \qquad (25)$$

Therefore, $$\|\dot u - \dot u_\alpha\|/\|\dot u\| \le \|I - J_E M(\alpha, c, u)\|. \qquad (26)$$

Now, notice that $$I - J_E M(\alpha \cdot c \cdot u) = J_E[J_E^+ - M(\alpha \cdot c \cdot u)] \qquad (27)$$

$$= [M(\alpha \cdot c \cdot u)^+ - J_E] M(\alpha \cdot c \cdot u): \qquad (28)$$

where the (n×m) matrix $J_E{}^+$, is the pseudoinverse of $J_E$; and the (m×n) matrix $M(\alpha, c, u)$ is the pseudoinverise of $M(\alpha, c, u)$. Then, it easily follows that $$\|I - J_E M(\alpha, c, u)\| \le \|J_E\| \, \|J_E{}^+ - M(\alpha, c, u).\|; \qquad (29)$$

which can also be expressed as $$\|I - J_E M(\alpha, c, u)\| \le \|M(\alpha, c, u)^+ - J_E\| \, \|M(\alpha, c, u)\|. \qquad (30)$$

In general, for any system it is required that $$\|\dot u - \dot u_\alpha\|/\|\dot u\| \to 0. \qquad (31)$$

By Eqs.(26), (29), and (30), this condition can be easily satisfied by any of the following expressions:

$$\|I - J_E M(\alpha, c, u)\| \to 0; \qquad (32)$$

$$\|J_E\| \, \|J_E{}^+ - M(\alpha, c, u)\| \to 0: \qquad (33)$$

$$\|M(\alpha, c, u)^+ - J_E\| \, \|M(\alpha, c, u)\| \to 0. \qquad (34)$$

Obviously, if the Jacobian matrix J is known and available; then $J_E = J$, and $J_E{}^+ = J^+$ in these expressions. However, in order to prevent ill-behaviour for those instances in which the Jacobian becomes ill-conditioned, it is preferable to set $J_E{}^+ = J_{wz\delta}{}^+$. This is due to the fact that when the Jacobian becomes ill-conditioned $\|J^+\|$ becomes excessively large (inducing an excessively large output): whereas, $\|J_{wz\delta}{}^+\|$ remains bounded.

Notice that Eqs.(32), (33), and (34), also serve to establish a condition or constraint to ensure that $M(\alpha, c, u) \to J_E{}^+ \to J_{wz\delta}{}^+(\psi)$. It is important to notice that expression (32) or (33) can be useful for both Control Problems, and Decision (Making/Resolution) Problems. However, for Decision problems, it is more difficult to estimate the Jacobian matrix. Thence, for this case it is more convenient to consider the expressions (34) and (32) in an appropriate way. This fact leads to devise somewhat different Schemes for Control Problems than those for Decision Problems. However, in both cases the developed Schemes rely heavily on the optimization of the Performance Criterion.

The nature of the matrix $M(\alpha, c, u)$ and Eqs.(32), (33), (34), lead to consider an off-line Optimization process as a strategy to tune/update parameters. That is, the $\|M(\alpha, c, u)\|$ can be considered as an objective function, and the Eqs.(32), (33), (34), are utilized to establish some appropriate constraints. Then, the parameters are tuned/updated by an Optimization process consisting of solving a series of Minimization problems. However, in order to ensure obtaining a global optimum for each Minimization problem is more convenient to consider the convex function $\|M(\alpha, c, u)\|^2$ as an objective function to be Minimized.

Also, notice that the Minimization of $\|M(\alpha, c, u)\|^2$ can be performed with respect to $\alpha$, c, and/or u: subject to some constraints from Eqs.(32), (33), (34): and also subject to a set of some appropriate (usually provided by the user) constraints. This leads to a solution which is optimal with respect to that set of constraints. However, in order to allow generality for a diversity of inputs, and facilitate the Optimization process is preferable to perform this process in two stages consisting of an initial Procedure and a parameter tuning/updating Scheme. As shown next, an initial Procedure and several Schemes can be devised both for Control Problems as well as for Decision Problems.

The FIGS. 4a–4e, show an overview of the envisioned Procedures and Schemes. Now, let T ol>0 be a small scalar representing a tolerance factor. Also, let $\eta>0$ be a scalar which can be used to normalize the system inputs: that is, $\eta=1$, or if appropriate set to another value. For Control Problems the following initial Procedure is first performed:

Procedure A

Select an appropriate set of initial values $\alpha_o$, $c_o$, and $u_o$ for the Minimization process.

Minimize $\|M(\alpha, c, u)\|^2$ with respect to $\alpha$, c, and u: subject to some appropriate constraints on $\alpha$, c, and u. Obtain the optimized $\alpha^*$, $c^*$, and $u^*$.

From Eq.(13) obtain the corresponding, $\Omega(\alpha^*, c^*, u^*)$: and compute $\psi^* = \Omega(\alpha, c, u,) + v\Delta t$, where v is a specified vector for constraint compliance, and $\Delta t > 0$ is a small scalar.

Compute $J_E(\psi^*)$.

Set the initial values $\alpha = \alpha^*$, and $c_o = c^*$, for the next Minimization process: or, if appropriate, select another set of initial values.

Set $\alpha = \alpha^*$, and $\tilde c = c^*$: or, if appropriate, select another set of values.

Set $u = \tilde u$ such that $\|\tilde u\| = \eta$.

Once this initial Procedure is performed, any of the next four Schemes can be selected for proper parameter tuning/updating.

Scheme I

Minimize $\|M(\alpha, c, u)\|^2$ with respect to the antecedent/premise and scaling parameters $\alpha$ and the consequent parameters c: and subject to $\|I-J_E(\psi^*)M(\alpha, c, \tilde{u})\|^2 \leq T$ ol, and some appropriate constraints on $\alpha$, and c. Obtain and record $\alpha$, and c, and also record $\|M(\alpha, \tilde{c}, \tilde{u})\|$.

Keep the initial values $\alpha$hd $o = \alpha^*$, and $c_o = c^*$: or, if appropriate, set $\alpha_o = \alpha$, $c_o = \tilde{c}$: or select another suitable set of initial values.

Repeat procedure for a specified number of iterations, for a wide range of $u = \tilde{u}$, such that $\|\tilde{u}\| = \eta$.

Select among the recorded values the smallest $\|M(\alpha, \tilde{c}, \tilde{u})\|$, and chose as optimal parameters the corresponding $\alpha$, and $\tilde{c}$.

Notice that this Scheme requires only one Minimization per iteration. However, in order to facilitate the use of Neuro-Fuzzy Inference Systems: it is convenient to split the Optimization process in two stages per iteration as shown in the following three Schemes.

Scheme II

Set the antecedent/premise and scaling parameters $\alpha = \alpha$.

Minimize $\|M(\alpha, c, \tilde{u})\|^2$ with respect to the consequent parameters c: and subject to $\|I-J_E(\psi^*)M(\alpha, c, \tilde{u})\|^2 \leq T$ ol, and some appropriate constraints on c. Obtain $\tilde{c}$.

Set $c = \tilde{c}$, and Minimize $\|M(\alpha, \tilde{c}, \tilde{u})\|^2$ with respect to the antecedent/premise and scaling parameters $\alpha$: and subject to $\|I-J_E(\psi^*)M(\alpha, \tilde{c}, \tilde{u})\|^2 \leq T$ ol, and some appropriate constraints on $\alpha$. Obtain and record $\alpha$: and also record $\tilde{c}$, and $\|M(\alpha, \tilde{c}, \tilde{u})\|$, keep the initial values $\alpha_o = \alpha^*$, and $c_o = c^*$: or, if appropriate, set $\alpha_o = \alpha$, $c_o = \tilde{c}$; or select another suitable set of initial values. Also, if appropriate, keep the obtained values $\alpha$: otherwise set them to suitable values.

Repeat procedure for at specified number of iterations, for a wide range of $u = \tilde{u}$, such that $\|\tilde{u}\| = \eta$.

Select among the recorded values the smallest $\|M(\alpha, \tilde{c}, \tilde{u})\|$, and chose as optimal parameters the corresponding $\alpha$, and $\tilde{c}$.

A variant of this Scheme, can easily be developed and is given as follows:

Scheme III

Set the consequent parameters $c = \tilde{c}$.

Minimize $\|M(\alpha, \tilde{c}, \tilde{u})\|^2$ with respect to the antecedent/premise and scaling parameters $\alpha$: and subject to $\|I-J_E(\psi^*)M(\alpha, \tilde{c}, \tilde{u})\|^2 \leq T$ ol, and some appropriate constraints on $\alpha$. Obtain $\alpha$.

Set $\alpha = \alpha$, and Minimize $\|M(\alpha, c, \tilde{u})\|^2$ with respect to the consequent parameters c: and subject to $\|I-J_E(\psi^*)M(\alpha, c, \tilde{u})\|^2 \leq T$ ol, and some appropriate constraints on c. Obtain and record $\tilde{c}$: and also record $\alpha$, and $\|M(\alpha, \tilde{c}, \tilde{u})\|$.

Keep the initial values $\alpha_o = \alpha^*$, and $c_o = c^*$: or, if appropriate, set $a_o = \alpha$, $c_o = \tilde{c}$; or select another suitable set of initial values. Also, if appropriate, keep the obtained values $\tilde{c}$; otherwise set them to suitable values.

Repeat procedure for a specified number of iterations, for a wide range of $u = \tilde{u}$, such that $\|\tilde{u}\| = \eta$.

Select among the recorded values the smallest $\|M(\alpha, \tilde{c}, \tilde{u})\|$, and chose as optimal parameters the corresponding $\alpha$, and $\tilde{c}$.

The previous two Schemes facilitate the use of Neuro-Fuzzy Inference Systems. However, in some cases it is required to minimize the error of the system output with respect to an optimal or reference output: i.e. with respect to $\Omega(\alpha^*, c^*, u^*)$. In these cases it is convenient to benefit from the fact that the output $\Omega(\alpha, c, u)$ can be expressed as a linear function of the consequent parameters c, and then use a Least Squares Minimization as a first stage. Thence, the next Scheme can be easily devised.

Scheme IV

Set the antecedent/premise and scaling parameters $\alpha = \alpha$.

For a wide range of of $\tilde{u}$ such that $\|\tilde{u}\| = \eta$: set $\Omega(\alpha, c, \tilde{u}) = \Omega(\alpha^*, c^*, u^*)$ and solve by a Least Squares method for the consequent parameters c. Obtain $\tilde{c}$.

Set $c = \tilde{c}$, and for any $\tilde{u}$ of the considered range; Minimize $\|\Omega(\alpha, \tilde{c}, \tilde{u}) - \Omega(\alpha^*, c^*, u^*)\|^2$ with respect to the antecedent/premise and scaling parameters $\alpha$: subject to some appropriate constrains on $\alpha$, and $\|I-J_E(\psi^*)M(\alpha, \tilde{c}, \tilde{u})\|^2 \leq T$ ol. Obtain and record $\alpha$: and also record $\tilde{c}$, and $D = \|\Omega(\alpha, \tilde{c}, \tilde{u}) - \Omega(\alpha^*, c^*, u^*)\|^2$.

Keep the initial values $\alpha_o = \alpha^*$, and $c_o = c^*$: or, if appropriate set $\alpha_o = \alpha$, $c_o = \tilde{c}$; or select another suitable set of initial values. Also, if appropriate, keep the obtained values $\alpha$: otherwise set them to suitable values.

Repeat procedure, for a specified number of iterations.

Select among the recorded values the smallest D, and chose as optimal parameters the corresponding $\alpha$, and $\tilde{c}$.

Since for Decision Problems it is not easy to estimate the Jacobian matrix $J_E(\psi)$, the parameter tuning/updating takes somewhat different stages. According to Eq.(34), the Minimization of $\|M(\alpha,c, u)\|$ is first sought: then, $J_E$ is set to $J_E = M(\alpha^*, c^*, u^*)^+$; and finally the Eq.(32) is used. This leads to the following initial Procedure and four Schemes:

Also in this case, let T ol>0 be a small scalar representing a tolerance factor, and the following initial Procedure is first performed:

Procedure B

Select an appropriate set of initial values $\alpha_o$, $c_o$, and $u_o$ for the Minimization process.

Minimize $\|M(\alpha, c, u)\|^2$ with respect to $\alpha$, c, and u: and subject to some appropriate constraints on $\alpha$, c, and u. Obtain the optimal $\alpha^*$, $c^*$, and $u^*$.

Obtain $M(\alpha^*, c^*, u^*)$ and compute numerically $M(\alpha^*, c^*, u^*)^+$.

Set the initial values $\alpha_o = \alpha^*$, and $c_o = c^*$, for the next Minimization process, or, if appropriate, select another suitable set of initial values.

Set $\alpha = \alpha^*$, and $\tilde{c} = c^*$: or, if appropriate, select another appropriate set of values.

Set $u = \tilde{u}$ such that $\|\tilde{u}\| = \eta$.

Once this initial Procedure is performed, any of the next four Schemes can be selected for proper parameter tuning/updating.

Scheme V

Minimize $\|M(\alpha, c, \tilde{u})\|^2$ with respect to the antecedent/premise and scaling parameters $\alpha$ and the consequent parameters c: and subject to $\|-M(\alpha^*, c^*, u^*)^+M(\alpha, c, \tilde{u})\|^2 \leq T$ ol, and some appropriate constrains on $\alpha$, and c. Obtain and record $\alpha$, and $\tilde{c}$, and also record $\|M(\alpha, \tilde{c}, \tilde{u})\|$, keep the initial values $\alpha_o = \alpha^*$, and $c_o = c^*$: or, if appropriate, set $\alpha_o = \alpha$, $c_o = \tilde{c}$; or select another suitable set of initial values.

Repeat procedure for a specified number of iterations, for a wide range of $u = \tilde{u}$, such that $\|\tilde{u}\| = \eta$.

Select among the recorded values the smallest $\|M(\alpha,\tilde{c},\tilde{u})\|$, and chose as optimal parameters the corresponding $\alpha$, and $\tilde{c}$.

Again, notice that this Scheme requires only one Minimization per iteration. Also for Decision Problems, in order to facilitate the use of Neuro-Fuzzy Inference Systems: it is convenient to split the Optimization process in two stages per iteration as shown in the following three Schemes.

Scheme VI

Set the antecedent/premise and scaling parameters $\alpha=\alpha$.

Minimize $\|M(\alpha, c, \tilde{u})\|^2$ with respect to the consequent parameters c: and subject to $\|I-M(\alpha^*, c^*, u^*)^+M(\alpha, c, \tilde{u})\|^2 \leq T$ ol, and some appropriate constraints on c. Obtain $\tilde{c}$.

Set $c=\tilde{c}$ and Minimize $\|M(\alpha, \tilde{c}, \tilde{u})\|^2$ with respect to the antecedent/premise and scaling parameters $\alpha$: and subject to $\|I-M(\alpha^*, c^*, u^*)^+M(\alpha, \tilde{c}, \tilde{u})\|^2 \leq T$ ol, and some appropriate constraints on $\alpha$. Obtain and record $\alpha$; and also record $\tilde{c}$, and $\|M(\alpha, \tilde{c}, \tilde{u})\|$.

Keep the initial values $\alpha_o=\alpha^*$, and $c_o=c^*$: or, if appropriate, set $\alpha_o=\alpha$, $c_o=\tilde{c}$; or select another suitable set of initial values. Also, if appropriate, keep the obtained values $\alpha$: otherwise set them to suitable values.

Repeat procedure for a specified number of iterations, for a wide range of $u=\tilde{u}$, such that $\|\tilde{u}\|=\eta$.

Select among the recorded values the smallest $\|M(\alpha, \tilde{c}, \tilde{u})\|$, and chose as optimal parameters the corresponding $\alpha$, and $\tilde{c}$.

A variant of this Scheme, can easily be developed and is given as follows:

Scheme VII

Set the consequent parameters $c=\tilde{c}$.

Minimize $\|M(\alpha, \tilde{c}, \tilde{u})\|^2$ with respect to the antecedent/premise and scaling parameters $\alpha$: and subject to $\|I-M(\alpha^*, c^*, u^*)^+M(\alpha,\tilde{c}, \tilde{u})\|^2 \leq T$ ol, and some appropriate constraints on $\alpha$. Obtain $\alpha$.

Set $\alpha=\alpha$, and Minimize $\|M(\alpha, c, \tilde{u})\|^2$ with respect to the consequent parameters c, and subject to $\|I-M(\alpha^*, c^*, u^*)^+M(\alpha, c, \tilde{u})\|^2 \leq T$ ol, and some appropriate constraints on c. Obtain and record $\tilde{c}$; and also record $\alpha$, and $\|M(\alpha, \tilde{c}, \tilde{u})\|$.

Keep the initial values $\alpha_o=\alpha^*$, and $c_o=c^*$: or, if appropriate, set $\alpha_o=\alpha$, $c_o=\tilde{c}$: or select another appropriate set of initial values. Also, if appropriate, keep the obtained values $\tilde{c}$: otherwise set them to suitable values.

Repeat procedure for a specified number of iterations, for a wide range of $u=\tilde{u}$, such that $\|\tilde{u}\|=\eta$.

Select among the recorded values the smallest $\|M(\alpha, \tilde{c}, \tilde{u})\|$, and chose as optimal parameters the corresponding $\alpha$, and $\tilde{c}$.

Again, the previous two Schemes facilitate the use of Neuro-Fuzzy Inference Systems. However, in some cases (in which it is required to minimize the error of the system output with respect to an optimal or reference output) it is convenient to benefit from the fact that the output $\Omega(\alpha, c, u)$ can be expressed as a linear function of the consequent parameters, and then use a Least Squares Minimization as a first stage. Notice that for Decision Problems although there is no a prior optimal nor reference output, the Procedure B allows to consider $\Omega(\alpha^*, c^*, u^*)$ as an appropriate reference output. Thence, the next Scheme can be easily devised.

Scheme VIII

Set the antecedent/premise and scaling parameters $\alpha=\alpha$.

For a wide range of wide range of $\tilde{u}$ such that $\|\tilde{u}\|=\eta$: set $\Omega(\alpha, c, \tilde{u})=\Omega(\alpha^*, c^*, u^*)$ and solve by a Least Squares method for the consequent parameters c. Obtain $\tilde{c}$.

Set $c=\tilde{c}$, and for any $\tilde{u}$ of the considered range; Minimize $\|\Omega(\alpha, \tilde{c}, \tilde{u})-\Omega(\alpha^*, c^*, u^*)\|^2$ with respect to the antecedent/premise and scaling parameters $\alpha$: subject to and some appropriate constraints on $\alpha$, and $\|I-M(\alpha^*, c^*, u^*)^+M(\alpha\tilde{c}, \tilde{u})\|^2 \leq T$ ol. Obtain and record $\alpha$: and also record $\tilde{c}$, and $D\equiv\|\Omega(\alpha, \tilde{c}, \tilde{u})-\Omega(\alpha^*, c^*, u^*)\|^2$.

Keep the initial values $\alpha_o=\alpha^*$, and $c_o=c^*$: or, if appropriate, set $\alpha_o=\alpha$, $c_o=\tilde{c}$; or select another suitable set of initial values. Also, if appropriate, keep the obtained values $\alpha$: otherwise set them to suitable values.

Repeat procedure, for a specific number of iterations.

Select among the recorded values the smallest D, and chose as optimal parameters the corresponding $\alpha$, and $\tilde{c}$.

Recall that that the expression $\|.\|$ stands for the s-norm $\|.\|_s$, which by Eqs.(7), (8). and (9) can be expressed ill terms of the weighted 2-norm $\|.\|_2$. Although appropriate, the 2-norm is a bit difficult to work with. Since the Frobenius norm represents a tight upper bound for the 2-norm, and is continuously differentiable in a large domain; thence, it is more convenient to consider the Frobenius norm in the Optimization process. That is, consider the properly weighted (n×m matrix) B: hence, its Frobenius norm is given by $$\|B\|_F=[\Sigma_{i=1}^n\Sigma_{j=1}^m|b_{ij}|^2]^{1/2}: \qquad (35)$$

where, for $i=1, \ldots n: j=1, \ldots m$: $b_{ij}$ is the (i, j) component of the weighted matrix B. Thence, for implementation purposes is more convenient to consider in the Optimization Process $\|W^{1/2}M(\alpha, c, u)Z^{-1/2}\|_F$; and $\|Z^{1/2}[I-AM(\alpha, c, u)Z^{-1/2}\|_F$, where $A=J_E(\psi^*)$, or $A=M(\alpha^*, c^*, u^*)$: and the Frohenius norm of other pertinent expressions.

Notice that in some applications the knowledge from the Experts (embedded in the membership functions), and following the Procedure A or B, may be sufficient for a somewhat effective system preformance. Thence, the considered Class of Fuzzy Inference Systems (FIS) can be considered as the Intelligent Inference System. However, in some applications it is required a high level of performance. In those cases is necessary to utilize also the previous Schemes.

A convenient strategy for parameter tuning/updating can consist of a two stage process: (a) perform an initial Procedure: and (b) then follow with any of the previous Schemes. However, in some cases it may be convenient to devise a strategy consisting of several stages. That is, (a) perform an initial procedure: (b) follow a particular Scheme up to a certain point: and then (continue (c) with a another Scheme. Moreover, for Decision Problems, in some cases it may be convenient to start with the Procedure B: then, follow one or several of Schemes V–VIII: and, once an approximation to the Jacobian matrix $J_E$ is available, continue with anyone of the Schemes II to IV.

Again, notice that most of the previous Schemes have been devised based on splitting the Optimization process in some Minimization stages. This is done to facilitate the implementation of the Adaptive Neuro-Fuzzy Inference System proposed here.

It is important to mention that the implementation of anyone of these Schemes enables the considered Class of Fuzzy Inference Systems (FIS) to become in fact a Class of Adaptive Fuzzy Inference Systems (AFIS). In many applications this class of Adaptive Fuzzy Inference Systems suffices to construct the Intelligent Inference System. However, in some applications the Schemes may require to perform a lengthly Optimization process. Thence, in those cases then it is preferable to utilize the envisioned Adaptive Neuro-Fuzzy Inference System described next.

Notice that a class of Adaptive Networks are functionally equivalent to some Fuzzy Inference Systems. It is relatively easy to show (Jang J.-S., 1997) that with an appropriate architecture this class of Adaptive Networks can represent the Class of Fuzzy Inference Systems considered here.

Usually for Adaptive Networks the training process is based in performing a series of forward and backward passes. The Class of Adaptive Networks envisioned here posses an architecture containing the appropriate number of layers to represent the Class of Fuzzy Inference Systems being considered here. In order to facilitate the hybrid learning of this Class of Adaptive Networks the parameter set is properly decomposed and several of the previous Schemes (for Control Problems II, III, or IV: whereas for Decision Problems VI, VII, VIII) devised in the previous section can be easily implemented. The resultant inference system in fact constitutes an Adaptive Neuro-Fuzzy Inference System.

That is, here also the overall training process consist of a series of forward and backward passes according to the( selected Scheme. For, example, according to Scheme II (or VI), in the forward pass the antecedent premise and scaling parameters are held constant, and at the end of the pass the consequent parameters are updated according to the corresponding Scheme step. Then, the consequent parameters are held constant and the antecedent/premise and scaling parameters are updated by the gradient descent according to the corresponding Scheme step. If necessary, for fine tunning/updating purposes, this process can be followed by another Scheme.

As previously mentioned, unlike other current applications, the objective is not to reduce it target error with respect at conventional reference output: but rather to optimize the proposed Performance Criterion over a wide range of inputs. That is, here the antecedent/premise and scaling parameters are properly tuned/updated, and the membership functions modified accordingly. Here, also the consequent parameters are properly tuned/updated to ensure that small output changes correspond to small input changes.

Notice that here the tuning/updating of the membership functions is based on tuned and updated antecedent/premise, scaling, and consequent parameters resulting from the optimization of a meaningful Performance Criterion. Therefore, the usual inherent subjectivity carried from the Experts into the membership functions is reduced. This fact is particular significant for Decision Problems.

The output of the Intelligent Inference System is a decision making/resolution set and diagnostic on the proper relations/percentages of structural elements and components and indicators of geometrical arrangements that constitute a proper design. Among others these components can be:

Text:
Video;
Film;
Audio;
Static/Dynamic Graphics:
Images/Pictures:
Browser features:
Linkages maps
Figures, frames, icons, etc.

The output can be expressed and implemented in a linguistic form, to serve as a guide for the design of the module to be displayed: or used to create, refine, and display automatically the module.

The Output Interface consists of a software program that receives some command tags from the Coordinating Module, and the decision resolution (diagnostic) from the Intelligent Inference System. In a generation mode it translates them into tags/labels (values) that are incorporated and properly set in a generated (advanced Hypertext Language type such as, but not necessarily, the HTML: or the Extensible Markup Language XML: and that allow dynamic interaction and operation) descriptive module. In the retrieval mode, similar steps are taken. However, in this case there is no actual descriptive module generation: rather, the target module is the retrieved descriptive module to which the updated tags/labels (values) are just transferred.

Finally, once the tags/label (values) are properly set (in the generated, or retrieved Hypertext Language type unit): the module can be instantaneously displayed.

Figure 2:
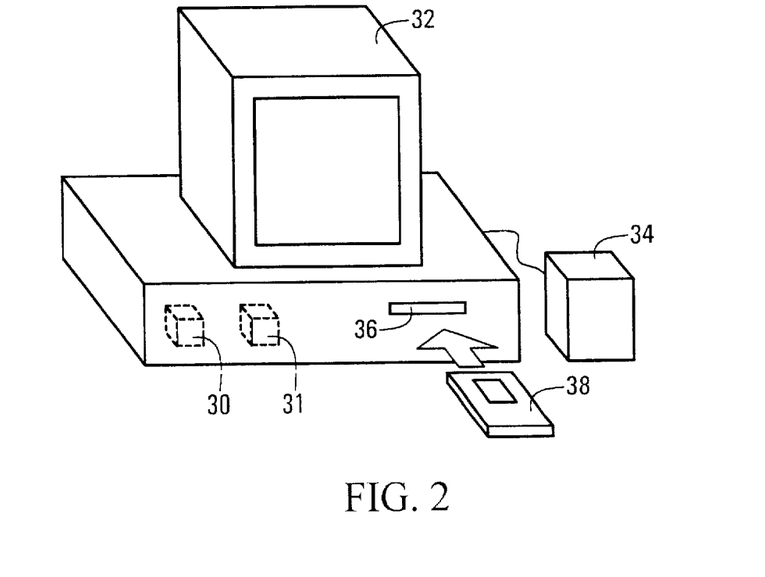
FIG. 2 is a perspective view of a computer which may use the intelligent agent of FIG. 1.

FIG. 2 illustrates a computer which may use the described intelligent agent. Turning to FIG. 2, the computer comprises a processor 30, memory 31, a user interface including a display 32 and speaker 34, and a media reader 36. Media reader 36 may read a computer media product 38 storing the described intelligent agent. In operation, the intelligent agent on media product 38 may be loaded into memory 31 and executed by processor 30 is aforedescribed in order to control the display and speaker when executing display and audio software modules.

It will be apparent that the described FIS and ANFIS models with tuned parameters could be used for any control problem or decision making problem. It is particularly advantageously employed in connection with highly nonlinear target systems.

Modifications will be apparent to those skilled in the art and, therefore, the invention is defined in the claims.

What is claimed is:

1. A method of operating a target system, comprising the steps of:
    (a) at each of a series of instants in time, developing one of a fuzzy inference system (FIS) model and an adaptive neuro-fuzzy inference system model of said target system, comprising:
        modelling a rate of change of an output vector of said target system as a product of a matrix of elements and a rate of change of an input vector of said system, elements of said matrix dependent upon antecedent, scaling, and consequent parameters and at least one element from said input vector;
        receiving constraints on antecedent, scaling, and consequent parameters and input vectors, thereby defining sets of acceptable antecedent, scaling, and consequent parameters and input vectors;
        receiving initial antecedent, scaling, and consequent parameters and an initial input vector;
        minimizing a consistent norm of said matrix to obtain optimized antecedent, scaling, and consequent parameters; and
    (b) operating said target system based on said developed model.

2. The method of claim 1 wherein said step of minimizing a norm of said matrix comprises minimizing a square of a norm of said matrix.

3. The method of claim 2 wherein said step of minimizing a square of a norm of said matrix comprises minimizing a square of a Frobenious norm of said matrix.

4. The method of claim 2 wherein said step of minimizing a norm of said matrix also obtains an optimized input vector and including the step of obtaining an estimated Jacobian matrix based on said optimized antecedent, scaling, and consequent parameters and said optimized input vector.

5. The method of claim 4 including the steps of: constraining acceptable input vectors to those having a norm equivalent to a constant; repetitively:
   (a) selecting a fixed input vector meeting said constraining step;
   (b) selecting initial antecedent, scaling, and consequent parameters;
   (c) minimizing a square of a norm of said matrix to obtain a valued matrix and corresponding antecedent, scaling, and consequent parameters;
   (d) provided a square of a norm of a difference of (i) an identity matrix and (ii) a product of (A) said estimated Jacobian matrix and (B) said valued matrix is less than a pre-set tolerance, storing a norm of said valued matrix and said corresponding antecedent, scaling, and consequent parameters;
selecting a stored norm of said valued matrix having a smallest value and selecting antecedent, scaling, and consequent parameters corresponding with said selected stored norm as tuned antecedent, scaling, and consequent parameters.

6. The method of claim 5 wherein step (b) comprises, on a first iteration, selecting said optimized antecedent, scaling, and consequent parameters as initial antecedent, scaling, and consequent parameters.

7. The method of claim 6 wherein step (b) comprises, on an iteration subsequent to said first iteration, selecting antecedent, scaling, and consequent parameters stored from step (d) of a prior iteration as initial antecedent, scaling, and consequent parameters.

8. The method of claim 7 wherein said step of constraining acceptable input vectors comprises constraining acceptable input vectors to those having a norm equal to a preset value.

9. The method of claim 5 wherein steps (c) and (d) are undertaken twice each iteration, once with antecedent and scaling parameters fixed at their initial values to obtain consequent parameters which are stored in a first repetition of step (d) and a second time with consequent parameters fixed at their obtained values to obtain antecedent and scaling parameters and a norm of a corresponding valued matrix which are stored in a second repetition of step (d).

10. The method of claim 5 wherein steps (c) and (d) are undertaken twice each iteration, once with consequent parameters fixed at their initial values to obtain antecedent and scaling parameters which are stored in a first repetition of step (d) and a second time with antecedent and scaling parameters fixed at their obtained values to obtain consequent parameters and a norm of a corresponding valued matrix which are stored in a second repetition of step (d).

11. The method of claim 5 wherein said estimated Jacobian comprises a generalized inverse of a matrix obtained by said minimization step of claim 1.

12. The method of claim 5 wherein said target system comprises a user interface and wherein said step of receiving constraints on antecedent, scaling, and consequent parameters and input vectors and the step of receiving initial antecedent, scaling, and consequent parameters and an initial input vector comprises: receiving a rule-based expert system for said user interface with initial membership functions; and receiving user preferences for said user interface.

13. The method of claim 4 including the steps of:
determining an optimized output vector based on said optimized antecedent, scaling, and consequent, parameters;
repetitively:
   selecting initial antecedent and scaling parameters;
   selecting a wide range of input vectors meeting said constraining step;
   for each one of said selected wide range of input vectors, set an expression for an output vector which is a function of said one input vector, said initial antecedent and scaling parameters, and unknown consequent parameters equivalent to said optimized output vector and determine consequent parameters based on a least squares method;
   minimize a square of a norm of a difference of (A) an output vector which is a function of unknown antecedent and scaling parameters, said determined consequent parameters, and any one input vector of said selected wide range of input vectors and (B) said optimized output vector to obtain a minimized value and corresponding antecedent and scaling parameters;
   provided a square of a norm of a difference of (i) an identity matrix and (ii) a product of (A) said estimated Jacobian matrix and (B) said valued matrix is less than a pre-set tolerance, storing a minimized value from said minimizing step and said corresponding antecedent, scaling, and consequent parameters;
selecting a stored minimized value having a smallest value and selecting antecedent and consequent parameters corresponding with said selected stored value as tuned antecedent and consequent parameters.

14. The method of claim 1 wherein said target system comprises a user interface and wherein said step of receiving constraints on antecedent, scaling, and consequent parameters and input vectors and the step of receiving initial antecedent, scaling, and consequent parameters and an initial input vector comprises: receiving a rule-based expert system for said user interface with initial membership functions; and receiving user preferences for said user interface.

15. A method of developing a fuzzy inference system (FIS) model of a target system for use in operating said target system, comprising the steps of:
   modelling a rate of change of an output vector of said target system as a product of a matrix of elements and a rate of change of an input vector of said system, elements of said matrix dependent upon antecedent, scaling and consequent parameters and at least one element from an input vector;
   receiving constraints on antecedent, scaling, and consequent parameters and input vectors, thereby defining sets of acceptable antecedent, scaling and consequent parameters and input vectors;
   receiving initial antecedent, scaling, and consequent parameters and an initial input vector; and
   minimizing a norm of said matrix to obtain optimized antecedent, scaling, and consequent parameters.

16. An intelligent agent for use in operating a user interface comprising:
   an active input interface for presenting user preference questions and receiving user preferences;
   an expert system for said user interface with initial membership functions;
   a fuzzy logic inference system (FIS);
   an adaptive neural network; and an output interface for controlling said user interface;

said FIS and adaptive neural network for receiving constraints on antecedent, scaling, and consequent parameters and input vectors, thereby defining sets of acceptable antecedent, scaling, and consequently parameters and input vectors and for receiving initial antecedent, scaling and consequent parameters and an initial input vector from said active input interface and said expert system and for for each of a series of instants in time:

modeling a rate of change of an output vector of said user interface as a product of a matrix of elements and a rate of change of an input vector of said system, elements of said matrix dependent upon antecedent, scaling, and consequent parameters and at least one element from an said input vector; and minimizing a norm of said matrix to obtain optimized antecedent, scaling, and consequent parameters and an optimized input vector.

17. The intelligent agent of claim 16 wherein said FIS and adaptive neural network are also for:

obtaining an estimated Jacobian matrix based on said optimized antecedent, scaling, and consequent parameters and said optimized input vector;

constraining acceptable input vectors to those having a norm equivalent to a constant;

repetitively:
  (a) selecting a fixed input vector meeting said constraining step;
  (b) selecting initial antecedent, scaling, and consequent parameters;
  (c) minimizing a square of a norm of said matrix to obtain a valued matrix and corresponding antecedent, scaling, and consequent parameters;
  (d) provided a square of a norm of a difference of (i) an identity matrix and (ii) a product of (A) said estimated Jacobian matrix and (B) said valued matrix is less than a pre-set tolerance, storing a norm of said valued matrix and said corresponding antecedent, scaling, and consequent parameters; and selecting a stored norm of said valued matrix having a smallest value and selecting antecedent and consequent parameters corresponding with said selected stored norm as tuned antecedent and consequent parameters.

18. The intelligent agent of claim 17 wherein said FIS and adaptive neural network, in obtaining said estimated Jacobian, obtain a generalized inverse of a matrix of elements obtained in said modelling operation.

19. A computer readable medium storing computer executable instructions that when loaded by a computing device, adapt said computing device to:

provide an active input interface for presenting user preference questions and receiving user preferences;

provide an expert system for said user interface with initial membership functions;

provide a fuzzy logic inference system (FIS);

provide an adaptive neural network; and provide an output interface for controlling said user interface;

said FIS and adaptive neural network for receiving constraints on antecedent, scaling, and consequent parameters and input vectors, thereby defining sets of acceptable antecedent, scaling, and consequently parameters and input vectors and for receiving initial antecedent, scaling and consequent parameters and an initial input vector from said active input interface and said expert system and for for each of a series of instants in time:

modeling a rate of change of an output vector of said user interface as a product of a matrix of elements and a rate of change of an input vector of said system, elements of said matrix dependent upon antecedent, scaling, and consequent parameters and at least one element from an said input vector; and minimizing a norm of said matrix to obtain optimized antecedent, scaling,, and consequent parameters and an optimized input vector.

20. The computer readable medium of claim 19 wherein said FIS and adaptive neural network are also for:

obtaining an estimated Jacobian matrix based on said optimized antecedent, scaling, and consequent parameters and said optimized input vector;

constraining acceptable input vectors to those having a norm equivalent to a constant;

repetitively:
  (a) selecting a fixed input vector meeting, said constraining step;
  (b) selecting initial antecedent, scaling, and consequent parameters;
  (c) minimizing a square of a norm of said matrix to obtain a valued matrix and corresponding antecedent, scaling, and consequent parameters;
  (d) provided a square of a norm a difference of (i) an identity matrix and (ii) a product of (A) said estimated Jacobian matrix and (B) said valued matrix is less than a pre-set tolerance, storing a norm of said valued matrix and said corresponding antecedent, scaling, and consequent parameters; and selecting a stored norm of said valued matrix having a smallest value and selecting antecedent and consequent parameters corresponding; with said selected stored norm as tuned antecedent and consequent parameters.

* * * * *